United States Patent
Bann et al.

(10) Patent No.: US 8,263,901 B2
(45) Date of Patent: Sep. 11, 2012

(54) METHOD FOR LASER MICROMACHINING

(75) Inventors: Robert Bann, Banbury (GB); Neil Sykes, Wantage (GB)

(73) Assignee: Oerlikon Solar AG, Truebbach, Truebbach (CH)

( * ) Notice: Subject to any disclaimer, the term of this patent is extended or adjusted under 35 U.S.C. 154(b) by 1128 days.

(21) Appl. No.: 12/118,961

(22) Filed: May 12, 2008

(65) Prior Publication Data
US 2008/0237206 A1    Oct. 2, 2008

Related U.S. Application Data

(62) Division of application No. 10/551,489, filed as application No. PCT/GB2004/001432 on Apr. 1, 2004, now Pat. No. 7,371,993.

(30) Foreign Application Priority Data

Apr. 3, 2003 (GB) .................................. 0307723.7

(51) Int. Cl.
B23K 26/38 (2006.01)
B23K 26/04 (2006.01)
(52) U.S. Cl. ............................. 219/121.69; 219/121.83
(58) Field of Classification Search ............. 219/121.68, 219/121.69, 121.73, 121.75, 121.83; 73/37.5; 250/201.2
See application file for complete search history.

(56) References Cited

U.S. PATENT DOCUMENTS

| | | | |
|---|---|---|---|
| 3,519,334 A * | 7/1970 | Heitmann et al. | 219/121.75 |
| 3,610,024 A * | 10/1971 | Honjo et al. | 73/37.5 |
| 4,550,241 A * | 10/1985 | Scott et al. | 219/121.67 |
| 4,710,908 A | 12/1987 | Ohshima et al. | |
| 4,854,156 A | 8/1989 | Hoeffel et al. | |

(Continued)

FOREIGN PATENT DOCUMENTS

DE    42 34 788    4/1994

(Continued)

OTHER PUBLICATIONS

Machine translation of Japan Patent document No. 5-200,579, Mar. 2012.*

(Continued)

*Primary Examiner* — Geoffrey S Evans
(74) *Attorney, Agent, or Firm* — Davis & Bujold, P.L.L.C.

(57) ABSTRACT

A method of laser micro-machining, by means of a laser, a work piece (31) of the type described comprising the steps of: locating the workpiece on a carrier forming a part of a transport system whereby the carrier can be displaced along a path (P) parallel to an X-axis of the workpiece, a Y-axis lying transverse the path, and a Z-axis lying transverse the path; focusing an image generated by means of an output beam from the laser at a working datum position (A) defined relative to the path which path is established by means of the transport system to traverse the first datum position; a plane defined by the X- and Y-Axis lying substantially perpendicular to the output beam; and displacing the workpiece along the path by way of the transport system so as to enable the work-piece to be subject to micro-machining by way of the laser characterized by the steps of: maintaining distance between the datum position and a current first surface position of the work-piece in the vicinity of the datum position; and varying the working datum position to accord with local variations in thickness of the workpiece so that the working datum position is maintained at a fixed distance relative to a surface of the workpiece apparatus therefor.

1 Claim, 7 Drawing Sheets

U.S. PATENT DOCUMENTS

| | | | |
|---|---|---|---|
| 5,061,839 A * | 10/1991 | Matsuno et al. | 219/121.83 |
| 5,690,785 A | 11/1997 | Nakaya | |
| 5,811,754 A | 9/1998 | Nakatani et al. | |
| 6,318,153 B1 | 11/2001 | Dumberger et al. | |
| 6,333,572 B1 | 12/2001 | Ono | |
| 6,452,131 B2 | 9/2002 | Britnell | |
| 6,467,922 B1 | 10/2002 | Blanc et al. | |
| 6,483,091 B1 | 11/2002 | Sadler et al. | |
| 6,590,182 B1 | 7/2003 | Domae | |
| 6,621,060 B1 | 9/2003 | Nantel et al. | |
| 6,622,544 B2 | 9/2003 | Akerblom | |
| 2002/0125230 A1 * | 9/2002 | Haight et al. | 219/121.69 |
| 2002/0125231 A1 * | 9/2002 | Hunter et al. | 219/121.73 |
| 2003/0022421 A1 | 1/2003 | Shimoto et al. | |
| 2003/0169524 A1 | 9/2003 | Adin et al. | |
| 2003/0183744 A1 * | 10/2003 | Nantel et al. | 250/201.2 |
| 2005/0241371 A1 * | 11/2005 | Carter et al. | 73/37.5 |
| 2006/0033056 A1 * | 2/2006 | Watkins et al. | 250/559.19 |
| 2008/0149605 A1 * | 6/2008 | Sykes | 219/121.82 |

FOREIGN PATENT DOCUMENTS

| | | | |
|---|---|---|---|
| JP | 63-56381 A | * | 3/1988 |
| JP | 63-56391 A | * | 3/1988 |
| JP | 5-23 880 A | | 2/1993 |
| JP | 5-200579 A | * | 8/1993 |
| JP | 5-228681 A | * | 9/1993 |
| JP | 2001-113384 A | * | 4/2001 |

OTHER PUBLICATIONS

Machine translation of Japan Patent document No. 5-228,681, Apr. 2012.*

Machine translation of Japan Patent document No. 2001-113,384, Apr. 2012.*

Abbott C et al: "New Techniques for Laser Micromachining MEMS Devices" 2002, Proceedings of the SPIE, SPIE, Bellingham, VA, US pp. 281-288 xp001193877 issn: 0277-786x.

* cited by examiner

METHOD FOR LASER MICROMACHINING

This application claims priority from and is a divisional application of U.S. application Ser. No. 10/551,489 filed Sep. 29, 2005, now U.S. Pat. No. 7,371,993 issued May 13, 2008, which is a national stage completion of PCT/GB2004/001432 filed Apr. 1, 2004, which claims priority from GB 0307723.7 filed on Apr. 3, 2003.

TECHNICAL FIELD

This invention relates to a positioning method and apparatus and a product of the method or apparatus. In particular it is concerned with the positioning of a workpiece or substrate typically in the form of a plate or sheet of substantial size for accurate laser micro-machining applications.

BACKGROUND ART

Pulsed laser micro-machining techniques using mask projection methods are now widely used for the creation of miniature structures in both massive and thin substrates. Micro-electro-mechanical systems (or 'MEMS') are frequently prototyped by 'excimer' laser ablation of polymer substrates using motion of the substrate and/or a mask to create complex 2.5D and 3D structures. Typically sub-micron thick inorganic, metallic and organic films incorporated in, for example, solar panels, sensors and display devices are often patterned using mask projection methods with both solid state and gas laser sources. Over many years such processes have become well established as production techniques. Improvements have mainly been directed to enhancements in laser drive technology rather than changes to basic mask projection, beam handling and motion control techniques.

In a paper 'New Techniques for Laser Micro-machining MEMS Devices' in Volume 4760 of the Proceedings of The International Society for Optical Engineering there are described two pulsed laser micro machining techniques termed 'Synchronised Image Scanning' ('SIS') and 'Bow Tie Scanning' ('BTS'). These techniques take advantage of the improvements made in speed and accuracy of modern stage and galvanometer mirror scanner systems. Both SIS and BTS allow major improvements to be made in the accuracy, speed and efficiency with which large area complex repeating arrays of miniature 2D and 3D patterns can be created by laser ablation. The techniques are readily used in the laser manufacturing of devices such as super-long ink jet printer nozzles (e.g. page-wide arrays), micro lens arrays, display enhancement films and plasma display panels (PDPs).

For precision laser micro machining it is essential to control accurately the distance between the focussing or imaging lens to the surface being machined. Typically the distance needs to be maintained within the depth of focus of the lens system.

In attempting to provide for accurate control of the distance between the projection lens and a substrate to be ablated by micro machining two methods are already known. Neither is trouble-free.

Firstly by mounting a substrate to be machined on a transport system and making use of laser reflection tracking to give information about the substrate position. Laser reflection tracking can give rise to difficulties arising from changes in transmission characteristics in the substrate material. Transport systems for the substrate can give rise to lagging or leading positional errors caused by feedback delays. Multi surface reflections or reflectivity changes can lead to locating errors.

Secondly by using ultra flat chucks to carry the substrate. Ultra flat chucks are unable to take into account variations in thickness of the substrate. Some types of substrate allow the passage of a laser beam that can lead to heating, if not damaging, of the chuck. Such chucks are inherently expensive to manufacture to sufficiently tight tolerances.

In considering a typical workpiece for laser micro-machining in the present context it is convenient to consider it in three dimensional rectilinear terms with a length measured along an X-axis, a width measured along an Y-axis and a thickness measured along a Z-axis. The thickness, measured along the Z-axis, is usually orders of magnitude less than the length, measured along the X-axis, or its width, measured along the Y-axis. Hereinafter such a work-piece is referred to as being 'of the type described'. However the present invention is not limited to a workpiece of these proportions and can be adapted to deal with work pieces of other shapes.

In considering a micro-machining process and the required position of a laser beam relative to a workpiece it is convenient to use the term 'datum position'. In the case of a focussed beam the point of focus represents the datum position. In the case of an image formed when a laser beam has passed through a mask then the location of the image formed by way of the laser beam is taken to be the datum position. In either case, to provide for accurate ablation or heating of a substrate, the datum position needs to be maintained in a fixed relationship relative to the surface of the substrate. In what follows the term 'datum position' should be interpreted appropriately for the laser optical system under consideration.

The term 'micro-machining' should be taken to include not only an ablation or image forming process but also heating of the workpiece at some position between the outside surfaces of the workpiece.

DISCLOSURE OF INVENTION

According to a first aspect of the present invention there is provided a method of micro-machining, by means of a laser, a work piece of the type described comprising the steps of:

locating the workpiece on a carrier forming a part of a transport system whereby the carrier can be displaced along a path parallel to an X-axis of the workpiece, a Y-axis lying transverse the path, and a Z-axis lying transverse the path;

causing an output beam from the laser to establish a datum position relative to the X, Y and Z axis of a workpiece and displacing the workpiece along the path by way of the transport system so as to enable the work-piece to be subject to micro-machining process by way of the laser characterised by the steps of:

maintaining distance between the datum position and a location on a surface of the workpiece in the vicinity of the datum position; and accommodating local variations in thickness of the workpiece so that the datum position is maintained at a fixed distance relative to a surface of the workpiece.

According to a first preferred version of the first aspect of the present invention the step of accommodating local variation in thickness in the workpiece is achieved by displacing the datum position to follow the surface of the workpiece.

According to a second preferred version of the present invention the step of accommodating local variation in thickness in the workpiece is achieved by displacing the surface of the work-piece relative to accord with the datum position.

According to a third preferred version of the present invention the maintaining distance step is undertaken by means of a distance sensing device comprising a body member riding on a fluid cushion on a first surface of the workpiece the fluid cushion being established by a flow of fluid fed from the body member so as to maintain the body member at a predetermined distance from first surface; and in the event the body member is displaced from a current position of the body member due to a variation in thickness of the workpiece any change in position of the body member perpendicular to the first surface is used to move the focussing or imaging lens to cause a corresponding change in the current datum position so as to restore the working datum position to its predetermined distance relative to the first surface of the workpiece. Preferably the body member is located relative to a first side of the workpiece and a further body member is provided located relative to a second side of the workpiece on the opposite side of the workpiece to the first side and the further body member serves to urge the workpiece towards the body member when a local thickness of the workpiece is reduced.

According to a fourth preferred version of the present invention or of any preceding preferred version thereof the workpiece is located on the carrier to provide for the plane of the workpiece defined by the X-axis and the Y-axis to be vertical or at some other angle to the horizontal.

According to a second aspect of the present invention there is provided apparatus for laser micro-machining a work piece of the type described comprising: a carrier forming a part of a transport system whereby the carrier can be displaced along a path parallel to an X-axis of the workpiece, a Y-axis lying transverse the path, and a Z-axis lying transverse the path; means whereby an output beam from a laser can be focussed or caused to generate an image at a predetermined working datum defined relative to the path which path is established by means of the transport system to traverse the first datum position; a plane defined by the X- and Y-axis lying substantially perpendicular to the output beam; drive means for causing the workpiece to be displaced along the path by way of the transport system so as to enable the work-piece to be subject at the datum position to micro-machining by way of the laser characterised by the steps of position maintaining means for the distance between a current working datum position and a current first surface position of the workpiece in the vicinity of the datum position; and datum positioning means enabling the working datum position to accord with local variations in thickness of the workpiece so that the working datum position is maintained at a fixed distance relative to a surface of the workpiece and/or providing a carrier and transport system enabling the workpiece to be displaced along the path with the plane of the workpiece defined by the X-axis and the Y-axis either vertical or at some other angle to the horizontal.

According to a first preferred version of the second aspect of the present invention the datum positioning means serves to displace the datum position relative to the path of the workpiece.

According to a second preferred version of the second aspect of the present invention the means for focus adjustment serves to displace the path of the work-piece relative to the datum position.

According to a third preferred version of the second aspect of the present invention the apparatus including a distance sensing device comprising a body member riding on a fluid cushion on a first surface of the workpiece, the fluid cushion being established by a flow of fluid fed from the body member so as to maintain the body member at a predetermined distance from first surface; and in the event the body member is displaced from a current position of the body member due to a variation in thickness of the workpiece any change in position of the body member perpendicular to the first surface is used to modify the focussing or imaging step to cause a corresponding change in the current datum position to restore the working datum position to its predetermined distance relative to the first surface of the workpiece.

According to a fourth preferred version of the second aspect of the present invention the body member is located relative to a first side of the workpiece and a further fluid emitting body member is provided located relative to a second side of the workpiece on the opposite side of the workpiece and the path to the first workpiece and fluid output from the further body member serves to urge the workpiece towards the body member when a local thickness of the workpiece is changed.

According to a third aspect of the present invention there is provided a product in the form of a substrate micro-machined by the method of the first aspect of the present invention or of any preferred version thereof.

According to a fourth aspect of the present invention there is provided a product in the form of a substrate micro-machined by way of apparatus the subject of the second aspect of the present invention or of any preferred version thereof.

Broadly the invention is concerned with providing for the accurate positioning of a datum position of a laser beam relative to a workpiece. Beams emitted by all types of laser can be used (whether as a continuous output or as a pulsed output) including solid state and gas lasers. By being able to focus or image accurately it becomes possible to provide for machining not only of the nearest surface of a substrate to an arriving laser beam but also to machine on the opposite face to the nearest face but also to focus on a region intermediate the outer faces typically to produce changes in inherent characteristics.

The ability to be able to focus accurately is clearly desirable but heretofore the practical achievement of this desirable end was problematic. Consider a substrate with the three rectilinear axes X, Y and Z mentioned earlier. During machining the X- and Y-axis lie in a plane perpendicular to the path of a laser beam directed towards the substrate. That is to say in a direction substantially along the Z axis. A conventional machining process provides for motion of the substrate along the X axis and also, when necessary, along the Y axis. Heretofore it appears to have been assumed that the substrate is of constant thickness and consequently by focussing the laser beam to be used at a fixed point relative to the x-y plane of the substrate. However in practice the substrate manufacturing processes does not necessarily result in a substrate with flat surfaces and with its thickness held to tight tolerances.

A process of inspection of substrates following their manufacture and prior to machining can be used to identify those dimensional tolerances of a manufactured substrate. In the event of making use of a conventional focussing system for the laser which is either not adjustable or is not readily during a machining process then either the substrate has to be checked to establish that the substrate is capable of being machined accurately (which is likely to lead to a significant rejection rate of substrate before they are machined) or alternatively all, or the majority, of the substrates are machined regardless of their manufactured tolerances with the result that a number will be rejected when machined items are found to have non-uniform image formed on them. In either case rejection is costly and can involve either scrapping or a recovery stage.

The present invention seeks to overcome this tolerance problem by providing for the substrate to be capable of relative movement along the Z-axis relative to a focus or to an imaging datum position. Two ways of achieving such relative movement will be discussed hereafter in relation to exemplary embodiments. Broadly the relative movement can be achieved in two ways.

Firstly by providing for the datum position of the laser beam to be linked to a Z-axis-tracking device which moves to automatically maintain a constant distance from the nearest substrate surface. This movement is conveyed to the focussing system for the laser to cause the datum position to be maintained effectively constant relative to the local substrate surface even if the local substrate thickness varies.

Secondly the datum position of the laser beam on the Z-axis is maintained fixed and the substrate biased towards the datum position by providing an alternative tracking device on the opposite side of the substrate to that towards which the laser beam is directed. In the event the actual or apparent local thickness of the substrate changes (whether due to actual dimensional change in the substrate material or because the carrier of the substrate creates a change on level) then the further tracking device acts to drive the surface of the substrate along the Z-axis towards or away from the datum position to ensure that the datum position is maintained at a constant height from the substrate surface.

In either case it is envisaged that the tracking device and the further tracking device can each be in the form of a fluidic unit with a working face directed towards the substrate surface. A flow of fluid is caused to pass out of the working face and along the local substrate surface to pass through a gap between the unit and the substrate. By maintaining a constant flow of fluid through the unit the working gap is maintained constant. In the event the substrate changes in thickness the working face moves to maintain the working height constant.

Typically the fluidic unit makes use of a fluid flow of air or some other gas or vapour or a mixture thereof. The fluid flow can also provide for a degree of local surface cooling or heating.

A fluidic unit can be arranged to provide for a cost effective process by using inert and non inert fluidising gases such as nitrogen, helium and oxygen. By establishing a closed circuit fluidic system the resulting machining process can provide for a closely controlled environment for the micromachining process concerned.

If the overall size of each fluidic unit is kept small then each unit can respond to relatively small changes in substrate surface levels. Each fluidic device can incorporate an inspection or tolerancing item such as a camera or parameter measuring means enabling recordable real time monitoring to be carried out.

In one passive embodiment the fluidic unit or units can be used to inspect a substrate so as to establish what dimensional changes, if any, are occurring in an un-machined substrate or in a machined or partially machined substrate.

While the exemplary embodiments refer to the use of fluidic device it is also envisaged the tracking device or devices could provide for the position of the datum position and the substrate to be established and maintained by magnetic field or fields rather than by fluidic flow.

BRIEF DESCRIPTION OF DRAWINGS

Examples of known micro-machining systems and exemplary embodiments of the invention will now be described with reference to the accompanying drawings of which:

FIG. 1

Figure 1:
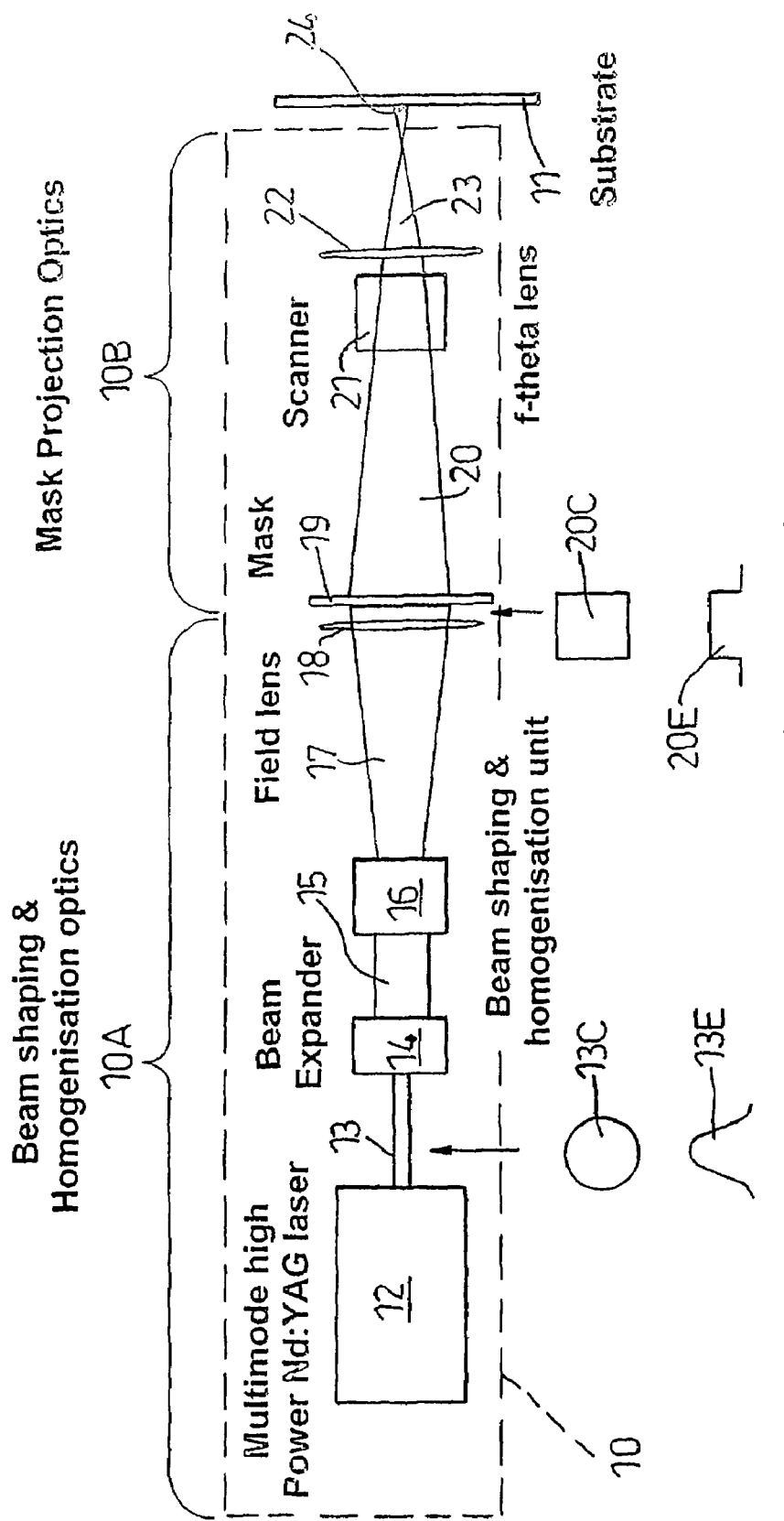
FIG. 1 shows a generalised diagram of a micro-machining laser unit making use of a first type of laser.

To set the present invention in a working context there will now be described in broad terms a laser system 10 providing for the micro-machining of a workpiece 11. The system 10 incorporates two optic sections;

beam shaping and homogenisation optics section 10A; and
mask projection optics 10B.

Laser 12 is a multi-mode high power solid state laser providing an output beam 13 having cross-section 13C and energy distribution 13E. The output beam 13 enters a beam expander 14 resulting in an output beam 15 of enlarged circular cross section which enters a beam shaping and homogenisation unit 16 from which a beam 17 of uniform cross sectional energy is formed at the mask plane to pass into the mask projection section 10B.

Beam 20 enters scanner 21 before passing through f-theta lens 22 to create an image beam 23 of uniform cross sectional energy at a datum position 24 here located on the surface of workpiece 11.

For convenience the system 10 is shown with the common axes of the various versions of the laser beams in a horizontal line. However in a practical working configuration the common axis is disposed vertically with the work-piece 11 extending horizontally at the lower end of the arrangement. In this case the work-piece 11 is located in an ultra-flat chuck (not shown) adapted for being driven in a known manner past the working datum position 24.

FIG. 2

This represents a second machining process making use of an UV Excimer laser 81. The laser 81 provides an output beam 82 which is subject to a beam shaping and homogenising stage 83 on which beam 82 if expanded through lens 84 to form beam 85 which enters a double array homogeniser 86 which gives rise to a plurality 87 of beams which enter field lens 88 prior to passing through a mask 89 to provide a beam 90 which passes through projection lens 91 to establish the required image on workpiece 92.

MODES FOR CARRYING OUT THE INVENTION

Two new systems according to the present invention directed to accurate and reproducible positioning will now be outlined.

FIG. 3

This shows diagrammatic output end 30 of a micro-machining unit with a workpiece 31 located on a carrier 32 (forming part of a workpiece transport system). The workpiece 31 can be displaced along a rail 33 in the direction of axis X (perpendicular to the plane of the drawing). In this case the laser beam 34, corresponding to beam 23 of FIG. 1, is focussed at datum position A to provide for the micro machining of, and through, first surface 31S of workpiece 31 by ablating predetermined regions of the workpiece 31. An air powered puck 37 is provided to automatically control the location of datum position A when required as will be described hereafter.

Ideally given that the work-piece 31 is of uniform thickness T; the carrier 32 is able to provide an steady progression along path P into the plane of the paper; and no relative lateral motion of first surface 31S of the workpiece 31 occurs in the direction of axis Z The fixed location of datum position A provides that the required micro-machining of the work piece 31 is readily achieved.

FIG. 3A (ENLARGEMENT OF PART OF FIG. 3)

Figure 3:
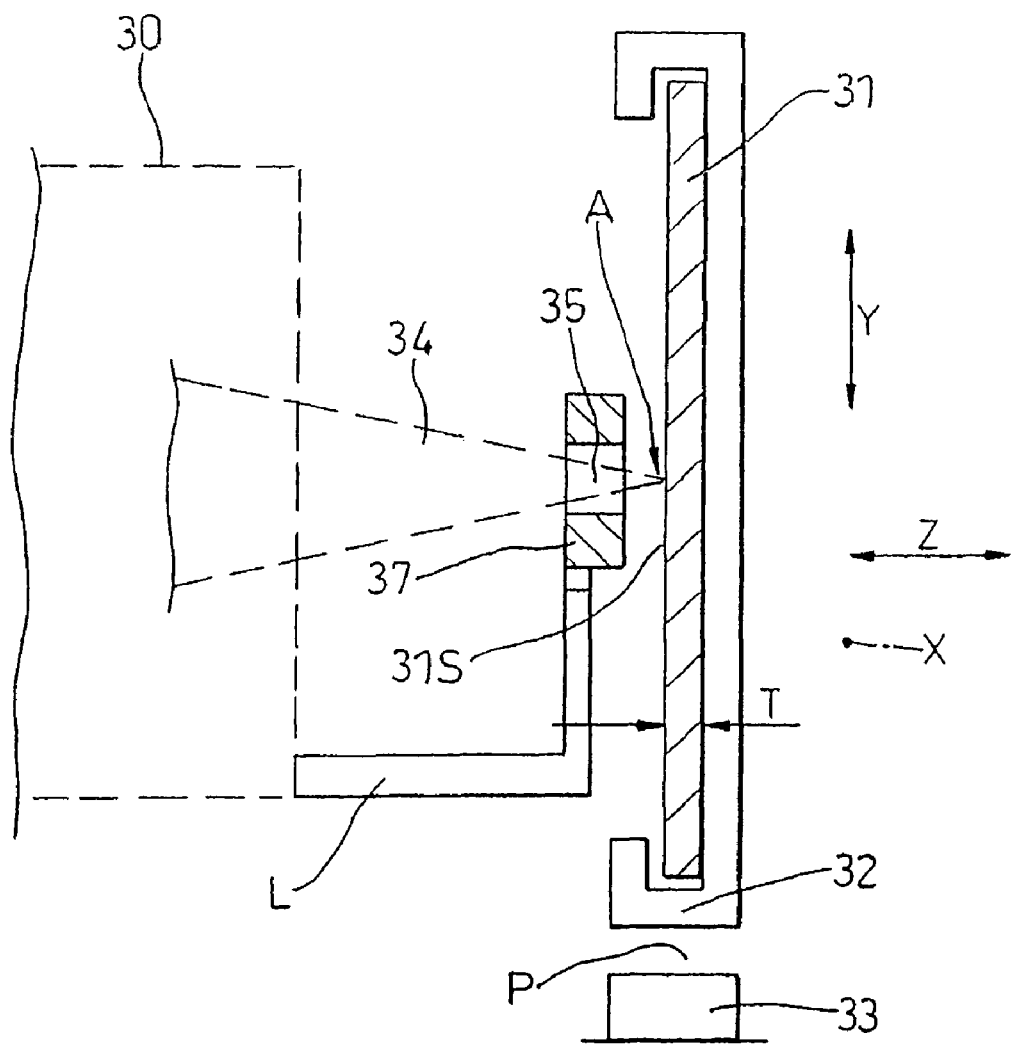
FIG. 3 is a diagrammatic view of a first embodiment of the present invention.
Figure 3A:
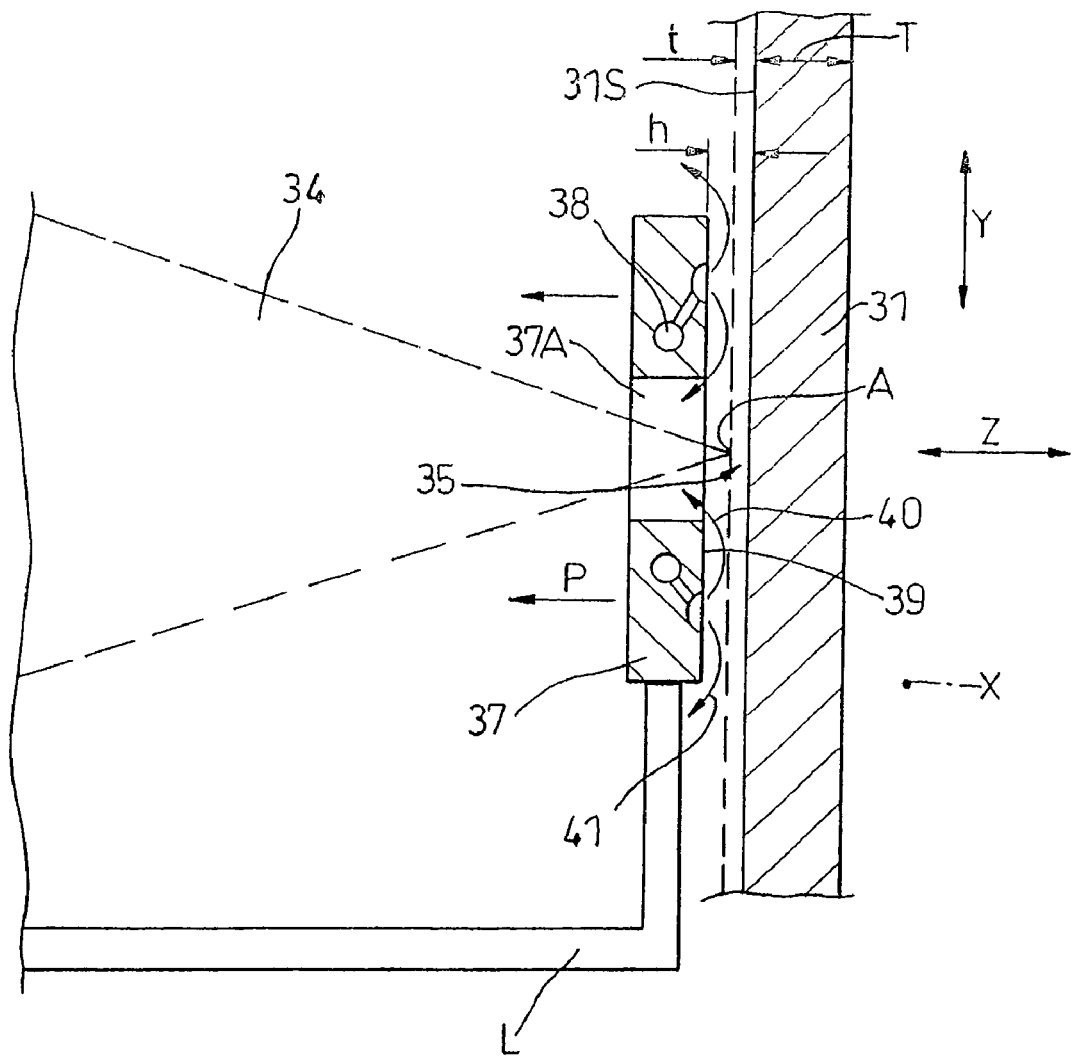
FIG. 3A is an enlarged view of a part of FIG. 3.

In practice it is found that many work-pieces to be machined are not of uniform thickness (in the direction of axis Z) throughout their length (taken as being along the X-axis). FIG. 3A is an enlargement of part of FIG. 3. In this case the workpiece 31 can fluctuate in thickness from minimum thickness T by an amount t to a maximum thickness of (T+t). The variation in thickness can either arise from an actual Z-axis dimensional change in the work-piece or arise from a support anomaly such as a change in chuck level.

Figure 5:
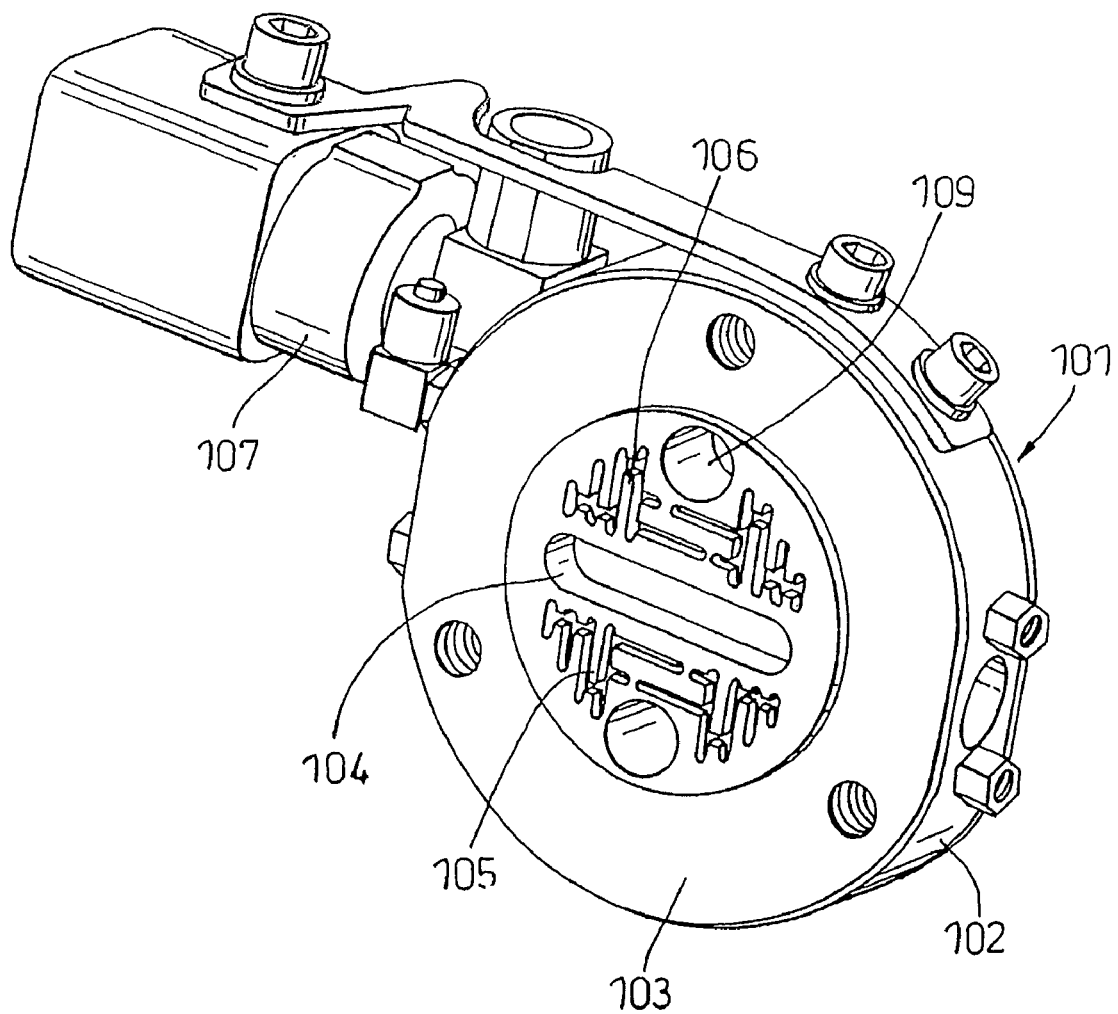
FIG. 5 is a view of a fluidic device referred to in connection with FIGS. 3 and 4.
Figure 6:
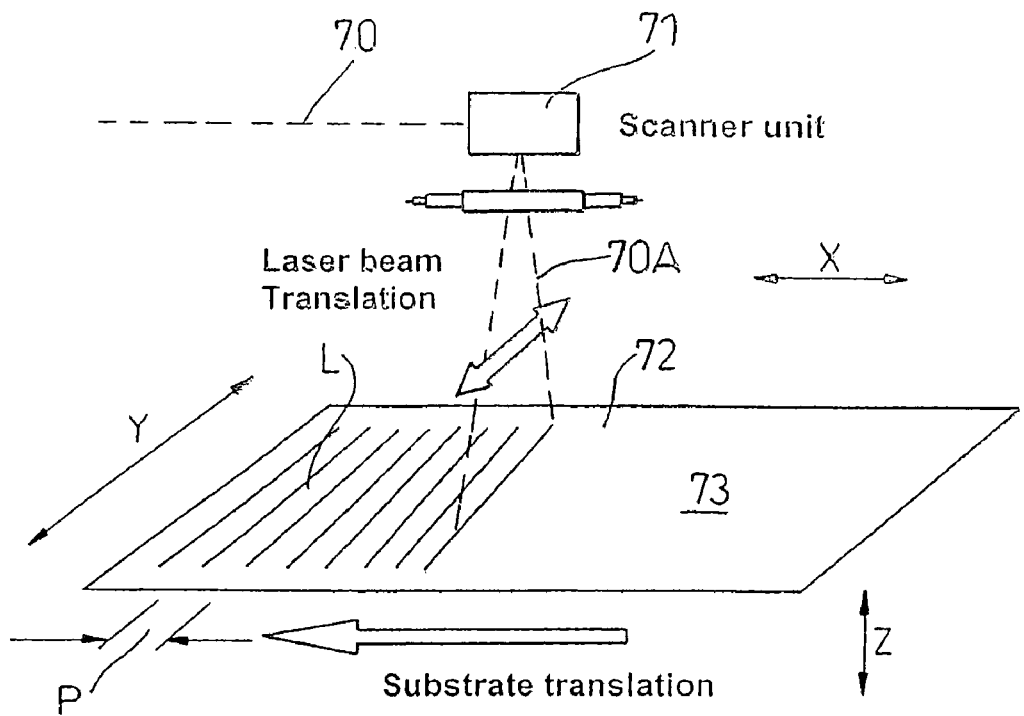
FIGS. 6, 6A show diagrammatically one form of micromachining making use of the present invention.
Figure 6A:
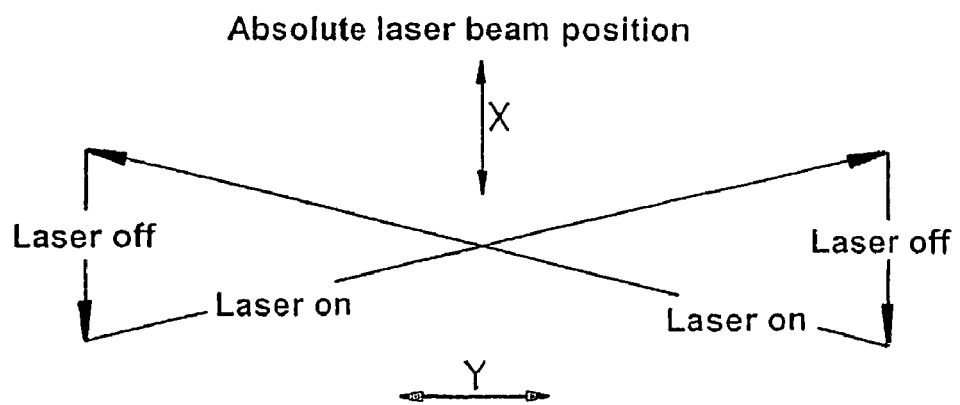

The puck 37 is of annular cross section with an inner aperture 37A. A suitable form of puck is shown in FIG. 5 with corresponding description hereafter. The puck 37 is mounted so as to be readily movable in the direction of axis Z while being held against movement in the direction of the horizontal axis X and vertical axis Y of the workpiece 31. The interior of the puck 37 is fed with a constant head air flow through a duct 38 so that air flows uniformly out of shaped underside 39 of the puck 37 and around inner periphery 40 and outer periphery 41. As a result the puck 37 is maintained hovering above first surface at a height h. The puck 37 is linked by link L to a lens (not shown) corresponding to f-theta lens 22 in FIG. 1 which provides for the establishment of the datum position whether established by focussing of the laser beam or of the position of an image of the mask formed by way of the laser beam. In this way any motion in the direction of the Z axis of the puck 37 is transmitted directly to the lens so as to move the datum position.

In use with the air flow through the puck 37 maintained constant and for as long as the thickness T of the workpiece 31 in the vicinity of the puck 37 remains unchanged then the puck 37, and the lens to which it is attached, remains motionless in the direction of axis Z. The datum position A remains unchanged. However in the event that the thickness T of the workpiece 31 increases by an amount t then the puck 37 in order to maintain the height h constant is displaced to the left by face 31S. The coupling to the f-theta lens causes the motion of the puck 37 to be transferred to the lens resulting in the optics moving the datum position A to the left as viewed. In this way the space between the instantaneous position of datum position 35 and the first surface 31S of the workpiece 31 is maintained relatively constant regardless of a change in thickness of the workpiece and consequently the depth of ablation achieved is maintained uniform by comparison with earlier ablations of the series thereof. A comparable effect is achieved when the thickness of the workpiece 31 is reduced to less than thickness T In such a case the coupling moves to the right with a consequent displacement of the lens and displacement of the datum position 35.

FIG. 4

This shows a system similar in some respects to that described in connection with FIG. 3A. However this embodiment provides for movement of the workpiece relative to the datum position rather than, as shown in FIG. 3, moving the datum position, relative to the work piece. This embodiment does away with the need for a lens adjustment to be made and so the puck can be maintained at a fixed position relative to the focussing or image-forming lens. In this embodiment a second annular air powered unit 43 is provided directed towards second surface 44T of workpiece 44 to complement the action of puck 45 directed towards first surface 44 S of workpiece 44.

In this case the puck 45 is static in position relative to the Z-axis and so does not need to transmit motion to cause lens movement. Consequently the datum position 46 is fixed in the axial direction Z relative to first surface 44S.

Figure 2:
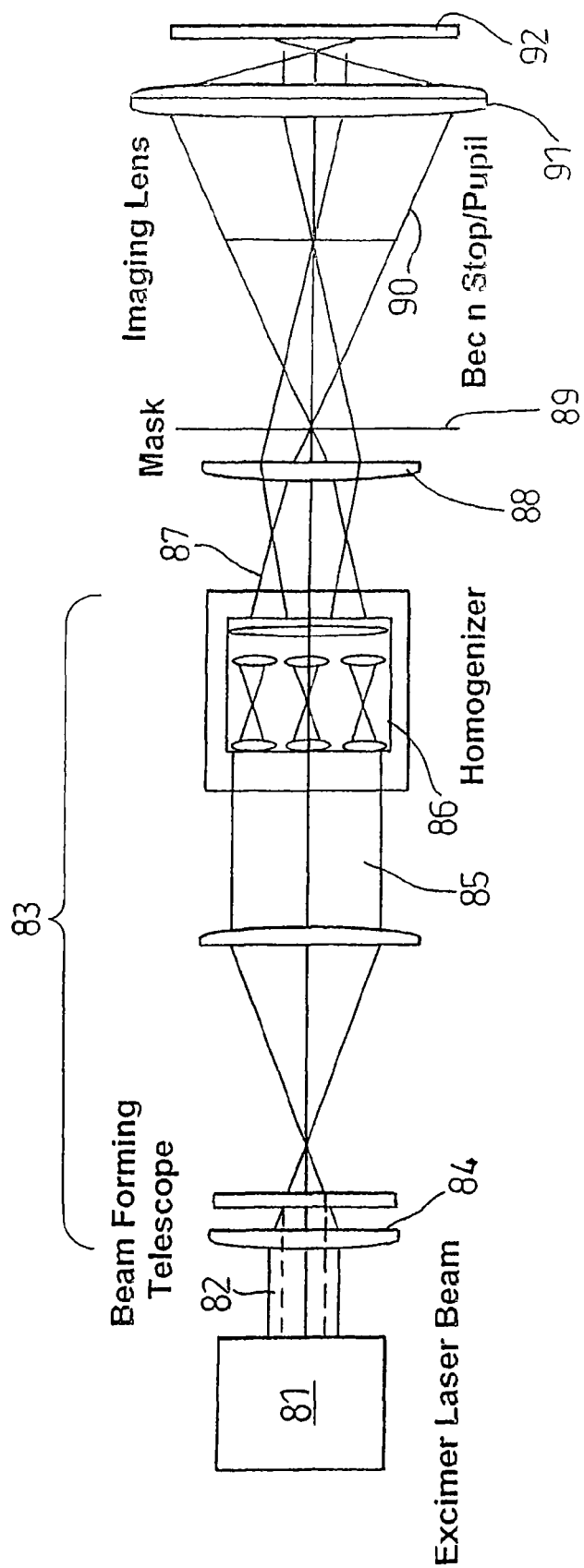
FIG. 2 shows a generalised diagram of a micro-machining laser unit making use of a second type of laser.

As was the case in connection with puck 37 of FIG. 2 the interior of the puck 45 is fed with a constant head air flow through a duct 48 so that air flows uniformly out of shaped underside 49 of the puck 45 and around inner periphery 50 and outer periphery 51 of the puck 45. For a given air flow the puck 45 is maintained at a height h from the first surface 44S of the workpiece 44 as it is moved along path P (corresponding to X axis of workpiece 44). In order to ensure that the first surface 44S of workpiece 44 is maintained at the fixed height h relative to the puck 45 the interior of the second air powered unit 43 is fed with a constant head airflow through a duct 52 so that air flows uniformly out of shaped underside 53 of the unit 43 and around inner periphery 54 and outer periphery 55 of the unit 43. This air flow ensures that pressure is sustained against second surface 44T to provide that the first surface 44S is maintained at a constant location on the Z axis to provide that the datum position 46 is maintained at a constant height. This serves to ensure a uniform depth of ablation of the workpiece 44 is caused to pass along path P regardless of local changes in thickness of workpiece 44. This arrangement would be useful for substrates that are relatively flexible.

FIG. 5

A fluidic device 101 (or puck) with a body member 102 has a working face 103. The body member 102 is circular in form with central slot 104 through which a laser beam is directed for a micro machining process. The working face is substantially symmetrical about slot 104 with fluid outlets 105, 106 to which a fluid flow can be established to provide for the uniform support of the working face 103 above a substrate surface. The body member 102 in this case has attached to it a housing 107 containing a camera enabling a view to obtain of a region beneath the working face 103 along port 109. In this way, typically, the result of a laser machining process carried out by way of slot 104 can be viewed and so the result of machining of a local region of the substrate.

The embodiments can involve different types of scanning for a range of workpieces. Typically they can be the sequence of one or more shot types of ablation outlined in connection with FIG. 1. A multiple sequence scan can be applied leading to parallel lines of ablated areas which can be achieved by displacing the workpiece in the direction of its Y axis as well as along the X axis.

FIGS. 6 AND 6A

Figure 4:
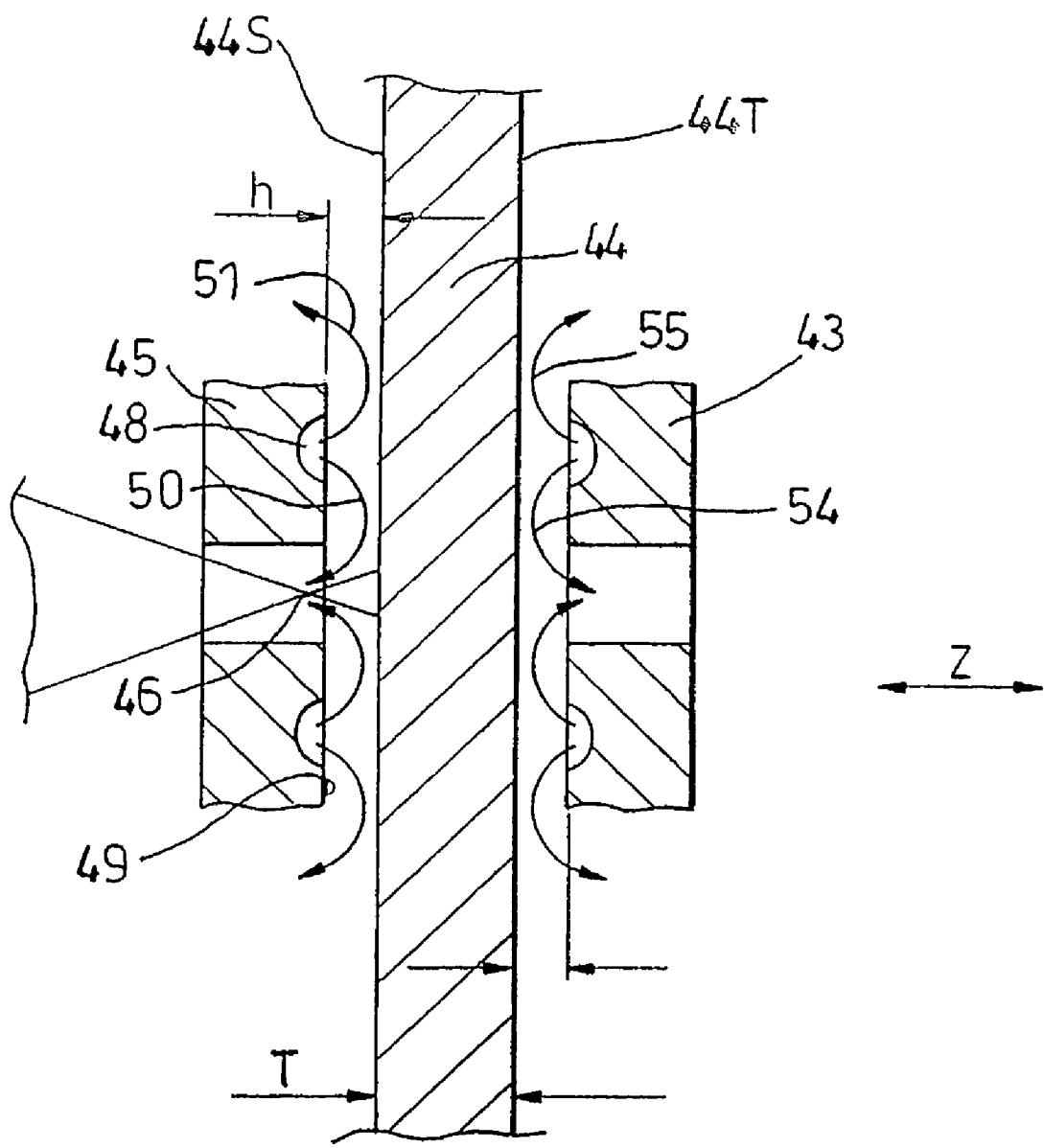
FIG. 4 is a diagrammatic view of a second embodiment of the present invention.

These show diagrammatically key features of what was earlier referred to as a Bow Tie Scheme. In this case a demagnified image of an aperture illuminated by laser beam 70 is scanned by unit 71 in a straight line at high speed across a section 72 of substrate workpiece 73 by galvanometer-driven deflection while the workpiece 73 is moved in axial direction X at constant speed. After each transverse scan the galvanometer mirror decelerates, reverses direction and performs a scan in the opposite direction. As shown in FIG. 4 the lines L drawn on the workpiece 73 are parallel and separated by the required pitch p. In order to track the motion of the workpiece 73 the scanner unit 71 has a second mirror unit that deflects beam 70A in a direction parallel to the stage travel. The combined motion of both galvanometer axes leads to a crossed beam trajectory resembling a bow tie shape as shown in FIG. 4A. As a result it has been found feasible to provide a BTS arrangement for patterning of a plasma display panel ('PDP') using a high power laser (of the order of 300 watts) with up to a 10 KHz repetition rate using a diode pumped Nd:YAG laser and incorporating precisely synchronised Q-switch firing of pulses together with beam positioning on the workpiece by the stage and scanner control systems. By using beam homogenisation and shaping techniques it is possible to create quasi-uniform top-hat rectangular intensity energy distribution at the plane of a mask and on the workpiece. Mask projection techniques incorporating scanner and optics with robust freestanding masks can be used to create individual PDP panels with T-bar or other complex electrode geometry.

INDUSTRIAL APPLICABILITY

The present invention can be embodied in a variety of ways to obtain a desired end. In the described exemplary embodiments the motion of the workpiece is only related to its X axis. However the transport system can readily provide for motion relative to the Y axis instead of, or in addition to, motion along the X axis. In the embodiments the workpiece is shown mounted vertically which can provide for working benefits in practice as against horizontal mounting. Alternatively the mounting can be at some angle to the horizontal.

The present invention is not limited to use with the laser arrangement outlined in connection with FIG. 1 or 2. They each served to exemplify one possible way of providing a focussed or imaged laser beam suitable for micro-machining use. The source of the laser beam and its subsequent treatment by optical stages can be met in a number of ways.

While the exemplary embodiments refer to a single machining laser acting on a substrate it is also envisaged that the invention can readily provide for a given substrate to be machined simultaneously from opposite sides by means of a second laser unit on the opposite side of the substrate to the main laser unit.

A variety of existing transport systems can be readily adapted to provide for the movement of the substrate through laser machining. Since the substrate is subject to use in conjunction with a fluidic unit, earlier referred to a puck, then the system provides: either the focus or image of the laser to be moved automatically in response to changes in the puck arising directly from substrate thickness changes or for the substrate to be moved automatically to ensure a working surface of the substrate is maintained at a fixed distance from the laser focus datum. As mentioned earlier the proposed system allows for thickness changes whether actual (arising inherently from the work piece) or virtual (arising from the way the work piece is supported or displaced) to be accommodated during a machining process. This 'automatic feedback' control would also serve to ameliorate, to at least a limited extent, for displacement of the substrate in the direction of the z-axis arising from the transport system rather than some dimensional change in the substrate

The invention claimed is:

1. A method of laser micro-machining a work-piece with a laser beam that is directed along an axis at a first surface of the work-piece, the laser beam comprising a datum position that is located along the axis, the method comprising the steps of:

securing a puck in relation to the laser beam such that a working face of the puck is aligned normal to the axis and is fixed in position along the axis in relation to the datum position;

aligning the first surface of the work-piece parallel to the working face of the puck, the work-piece being movable along the axis in relation to the puck and the datum position of the laser beam;

directing a constant flow of fluid through a duct in the working face of the puck towards the first surface of the work-piece to maintain the first surface of the work-piece at a certain axial distance in relation to the datum position of the laser beam regardless of changes of dimension of the work-piece along the axis;

aligning a surface of an air powered unit parallel to a second surface of the work-piece, the second surface being opposite the first surface of the work-piece and the work-piece being located along the axis between the puck and the air powered unit; and applying a pressure against the second surface of the work-piece by directing a constant flow of fluid through a duct in the surface of the air powered unit towards the second surface of the work-piece to maintain the first surface of the work-piece at the certain axial distance in relation to the datum position of the laser beam regardless of the changes of dimension of the work-piece along the axis.

\* \* \* \* \*